(12) United States Patent
Park (10) Patent No.: US 12,118,706 B2
(45) Date of Patent: Oct. 15, 2024

(54) METHOD AND APPARATUS OF EVALUATING QUALITY OF WAFER OR SINGLE CRYSTAL INGOT

(71) Applicant: SK SILTRON CO., LTD., Gumi-si (KR)

(72) Inventor: Hyun Woo Park, Gumi-si (KR)

(73) Assignee: SK SILTRON CO., LTD., Gumi-si (KR)

( * ) Notice: Subject to any disclaimer, the term of this patent is extended or adjusted under 35 U.S.C. 154(b) by 364 days.

(21) Appl. No.: 17/647,388

(22) Filed: Jan. 7, 2022

(65) Prior Publication Data
US 2022/0237771 A1 Jul. 28, 2022

(30) Foreign Application Priority Data

Jan. 28, 2021 (KR) .................... 10-2021-0012285

(51) Int. Cl.
*G06T 7/00* (2017.01)
*G01N 21/95* (2006.01)
(Continued)

(52) U.S. Cl.
CPC ....... *G06T 7/0004* (2013.01); *G01N 21/9505* (2013.01); *G06N 5/022* (2013.01);
(Continued)

(58) Field of Classification Search
CPC . G06T 7/0004; G06T 3/00; G06T 7/11; G06T 2207/20081; G06T 2207/30148;
(Continued)

(56) References Cited

U.S. PATENT DOCUMENTS

2014/0290563 A1* 10/2014 Jang .................. C30B 15/203
73/866
2018/0107928 A1 4/2018 Zhang et al.

FOREIGN PATENT DOCUMENTS

CN 103020654 A 4/2013
CN 103650124 A 3/2014
(Continued)

OTHER PUBLICATIONS

Yang et al, Enhancing Generalization of Wafer Defect Detection by Data Discrepancy-aware Preprocessing and Contrast-varied Augmentation, 25th Asia and South Pacific Design Automation Conference (ASP-DAC) (Year: 2020).*
(Continued)

*Primary Examiner* — Ping Y Hsieh
*Assistant Examiner* — Xiao Liu
(74) *Attorney, Agent, or Firm* — Lewis Roca Rothgerber Christie LLP (57) ABSTRACT

A method of evaluating quality of a wafer or an apparatus of evaluating quality of a wafer may include: performing a copper-haze evaluation on a piece of wafer or a single crystal ingot; collecting copper-haze map data and a copper-haze evaluation score based on a result of the copper-haze evaluation; training an artificial intelligence model based on the copper-haze map data and the copper-haze evaluation score; and performing crystal defect evaluation on the piece of the wafer or the single crystal ingot using the learned artificial intelligence model that outputs the copper-haze evaluation score when the copper-haze map data is input.

7 Claims, 6 Drawing Sheets

(51) Int. Cl.
*G06N 5/022* (2023.01)
*G06T 3/00* (2006.01)
*G06T 7/11* (2017.01)

(52) U.S. Cl.
CPC ............... *G06T 3/00* (2013.01); *G06T 7/11* (2017.01); *G06T 2207/20081* (2013.01); *G06T 2207/30148* (2013.01)

(58) Field of Classification Search
CPC ... G06T 2207/20084; G06T 7/62; G06T 3/18; G06T 2207/20048; G01N 21/9505; G01N 2021/8477; G01N 2021/8883; G01N 21/8851; G01N 2021/8887; G01N 21/8803; G06N 5/022; G06N 3/08; G06N 20/00; G06Q 10/06395; G06F 18/214; C30B 15/00; C30B 35/00; H01L 22/12; H01L 22/20; H01L 22/30
See application file for complete search history.

(56) References Cited

FOREIGN PATENT DOCUMENTS

| | | |
|---|---|---|
| CN | 109345511 A | 2/2019 |
| CN | 110414506 A | 11/2019 |
| CN | 111062310 A | 4/2020 |
| JP | 2019-537839 A | 12/2019 |
| KR | 10-1252404 B1 | 4/2013 |
| KR | 10-1443494 B1 | 9/2014 |
| KR | 10-2019-0066686 A | 6/2019 |
| KR | 10-2020-0094976 A | 8/2020 |

OTHER PUBLICATIONS

Notice of Allowance for Korean Application No. 10-2021-0012285 dated Apr. 17, 2023, 2 pages.
Chinese Office Action for CN Application No. 202210066477.4 dated Aug. 6, 2024, 10 pages.
Zhang, et al. "High-resolution remote sensing image processing and application based on deep neural network technology", Aug. 31, 2020, pp. 84-86.

\* cited by examiner

METHOD AND APPARATUS OF EVALUATING QUALITY OF WAFER OR SINGLE CRYSTAL INGOT

CROSS-REFERENCE TO RELATED APPLICATIONS

Pursuant to 35 U.S.C. § 119(a), this application claims the benefit of earlier filing date and right of priority to Korean Patent Application No(s). 10-2021-0012285, filed on Jan. 28, 2021, the contents of which are all hereby incorporated by reference herein in its entirety.

TECHNICAL FIELD

The present disclosure relates to an apparatus and method of detecting crystal defects by evaluating quality of a wafer or a single crystal ingot used in a semiconductor process.

BACKGROUND ART

In general, a Czochralski (hereinafter, referred to as "CZ") method has been widely used as a method of fabricating a silicon wafer. In the CZ method, a single crystal silicon ingot is grown by charging polycrystalline silicon into a quartz crucible, heating and melting with a graphite heating element, and then, immersing a seed crystal in a silicon melt formed by melting so that crystallization occurs at an interface, and pulling up while rotating the seed crystal. Thereafter, a wafer form is fabricated by slicing, etching, and polishing the silicon ingot.

The single crystal silicon ingot or the silicon wafer fabricated by using such a method has crystal defects such as crystal originated particles (COP), flow pattern defect (FPD), oxygen induced stacking fault (OISF), and bulk micro defect (BMD), and it is required to reduce the density and size of the grown-in defects introduced during such growth, and it has been confirmed that the crystal defects affect the yield and quality of the device. Therefore, a technique for easily and quickly evaluating such defects at the same time as removing crystal defects is important.

According to the related art, in a single crystal ingot fabricated by the CZ method, a V-rich region having void defects is generated when the ingot is grown at a critical value of V/G or more (high-speed growth) according to a Voronkov theory referred to as "V/G", oxidation induced stacking fault (OISF) defects are generated in a ring shape at an edge or center region when the ingot is grown at the critical value of V/G or less (low-speed growth), and an I-rich region which is a loop dominant point defect (LDP) zone is generated by a tangle of dislocation loops in which interstitial silicon is gathered when the ingot is grown at a lower speed.

A defect-free region, which is neither V-rich nor I-rich, exists at a boundary between the V-rich region and the I-rich region. The defect-free region is also divided into a vacancy dominant point defect zone (VDP) region and an interstitial dominant point defect zone (IDP) region, and the region is recognized as a manufacturing margin in order to fabricate such a defect-free wafer.

Meanwhile, a method of evaluating quality of a wafer or a single crystal ingot was also emphasized, and accordingly, according to a method of evaluating quality of a wafer or a single crystal ingot according to an embodiment and a method of controlling quality of a single crystal ingot using the same, it is possible to perform quality prediction and precision control through scoring with respect to an entire prime range by establishing a model using a copper (Cu) haze evaluation method in growing a high-quality silicon (Si) single crystal and preparing quantitative criteria in setting a target pulling speed.

According to the embodiment, scoring may be possible through the Cu haze evaluation method during growing of a defect-free single crystal by Cu haze modeling, and a corresponding region may be distinguished through a Cu haze map generated during quality evaluation by providing a score for each crystal region, and thus, an accurate target pulling speed in a next batch may be set by adjusting a pulling speed scored with respect to a region distinguished by a map for each prime range.

However, in the above-described method, since an operator manually checked the crystal region of the copper-haze map and provided a score to the region corresponding to defects, there was a problem that the accuracy and reliability of the corresponding evaluation method deteriorated.

SUMMARY

Technical Problem

An object of the present disclosure is to improve a conventional wafer quality evaluation method in which an operator visually checks a crystal region of a copper-haze map and directly provides a score to a region corresponding to defects.

An object of the present disclosure is to train an artificial intelligence model by generating a plurality of virtual copper-haze map data using data augmentation.

An object of the present disclosure is to calculate a copper-haze map score using a learned artificial intelligence model.

Technical Solution

A method of evaluating quality of a wafer according to an embodiment of the present disclosure may include: performing a copper-haze evaluation on a piece of wafer or a single crystal ingot; collecting copper-haze map data and a copper-haze evaluation score based on a result of the copper-haze evaluation; training an artificial intelligence model based on the copper-haze map data and the copper-haze evaluation score; and performing crystal defect evaluation on the piece of the wafer or the single crystal ingot using the learned artificial intelligence model that outputs the copper-haze evaluation score when the copper-haze map data is input.

In addition, the training of the artificial intelligence model based on the copper-haze map data and the copper-haze evaluation score may include; performing learning data augmentation that generates at least one piece of virtual copper-haze map data based on the copper-haze map data; and training the artificial intelligence model using the copper-haze evaluation score corresponding to the virtual copper-haze map data generated according to the copper-haze map data and the learning data augmentation.

In addition, the performing of the learning data augmentation may include; dividing the copper-haze map data into a BP region and a BSW region; performing image transformation on each of the divided images; and generating the virtual copper-haze map data based on each of the divided images on which the image transformation has been performed.

In addition, the dividing of the copper-haze map data into the BP region and the BSW region may further include dividing each of the BP region and the BSW region into an edge region and a center region.

In addition, the image transformation may include at least one transformation of tilt, shearing, reflection, rotation, and clipping of the image.

In addition, the performing of the crystal defect evaluation on the wafer or the single crystal ingot using the learned artificial intelligence model may include: dividing each of the copper-haze map and virtual copper-haze map data into a BP region and a BSW region using the artificial intelligence model; and calculating copper-haze scores for an edge region and a center region of each of the BP region and BSW region, respectively using the artificial intelligence model.

An apparatus of evaluating quality of a wafer according to an embodiment of the present disclosure may include: an input unit that receives copper-haze map data of a wafer; a processor that evaluates the quality of the wafer using an artificial intelligence model learned so as to output a copper-haze score when the copper-haze map data is input; and a display unit that outputs a result of the quality of the wafer.

In addition, the processor may perform learning data augmentation that generates at least one piece of virtual copper-haze map data based on the copper-haze map data and trains the artificial intelligence model using a copper-haze evaluation score corresponding to the virtual copper-haze map data generated according to the copper-haze map data and the learning data augmentation.

In addition, the processor may divide the copper-haze map data into a BP region and a BSW region, perform image transformation on each of the divided images, and generate the virtual copper-haze map data based on each of the divided images on which the image transformation is performed.

In addition, the processor may further divide each of the BP region and the BSW region into an edge region and a center region, performs the image transformation on each of the divided images and generate the virtual copper-haze map data based on each of the divided images on which the image transformation is performed.

Advantageous Effects

According to an embodiment of the present disclosure, an artificial intelligence model can be effectively learned by generating a plurality pieces of virtual copper-haze map data using data augmentation.

The present disclosure can provide a highly reliable copper-haze evaluation using a learned artificial intelligence model.

DETAILED DESCRIPTION OF THE EMBODIMENTS

Hereinafter, the present disclosure will be described in detail.

The embodiments described below are merely examples of the present disclosure, and the present disclosure may be modified in various forms. Accordingly, the specific features and functions disclosed below do not limit the scope of the claims.

Hereinafter, the embodiment disclosed in the present specification will be described in detail with reference to the accompanying drawings, but the same or similar components are designated by the same reference numerals regardless of drawing numbers, and repeated description thereof will be omitted. The component suffixes "module" and "part" used in the following description are given or mixed together only considering the ease of creating the specification, and have no meanings or roles that are distinguished from each other by themselves. In addition, in describing the embodiments disclosed in the present specification, when it is determined that detailed descriptions of a related well-known art unnecessarily obscure gist of the embodiments disclosed in the present specification, the detailed description thereof will be omitted. Further, the accompanying drawings are merely for facilitating understanding of the embodiments disclosed in the present specification, the technological scope disclosed in the present specification is not limited by the accompanying drawings, and it should be understood as including all modifications, equivalents and alternatives that fall within the spirit and scope of the present disclosure.

It will be understood that, although the terms "first," "second," etc. may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

First, a wafer processing process according to an embodiment of the present disclosure may be performed in the following order.

The wafer processing process may include a process of slicing a bare wafer after growing a single crystal ingot, a process of lapping a surface of the wafer to remove damage to the surface generated during slicing and to improve flatness, a process of etching microcracks or surface defects generated on the surface of the wafer polished in the lapping process by chemical reaction, a process of grinding saw marks on the surface of the wafer using a wheel, a process of slight-etching the surface of the wafer, a process of polishing the surface of the wafer to improve surface roughness and flatness of the wafer, and a process of cleaning the wafer.

Hereinafter, a copper-haze evaluation method to be performed to determine crystal defects of a wafer after the slicing process of the wafer will be described.

Figure 1:
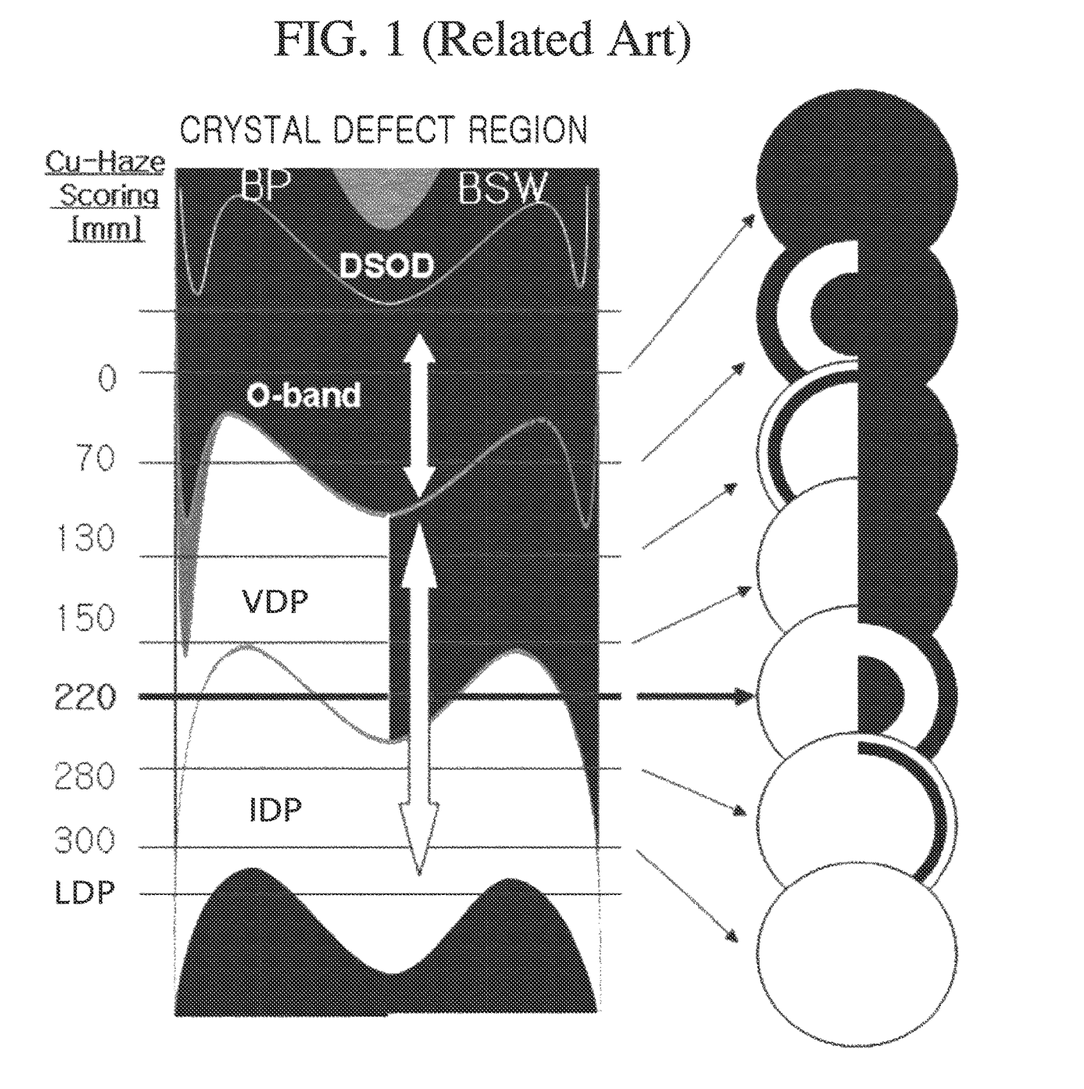
FIG. 1 is an exemplary view illustrating control of a pulling speed according to the related art.

FIG. 1 is an exemplary view illustrating control of a pulling speed according to the related art.

For example, an O-band region, a VDP region, an IDP region, and a LDP region may be distinguished through a first heat treatment BP and a second heat treatment BSW by a Cu haze evaluation method.

The Cu haze evaluation method employed in the embodiment may be an evaluation method, in which one surface of a wafer or piece of Si single crystal is contaminated with high-concentration Cu by using a Cu-contaminated solution, a mixed solution of a buffered oxide etchant (BOE) solution and Cu, and a quick diffusion heat treatment is performed, and then crystal defect regions are distinguished by visually observing a contaminated surface or an opposite surface thereof under a spotlight. However, the embodiment is not limited thereto.

Examples of first sample to seventh sample (S1 to S7) on the right side of FIG. 1 show various types that may be presented as Cu haze scoring maps after a single crystal is grown at a predetermined target pulling speed.

For example, the first sample Si having an entire black surface at the top indicates a state biased toward an O-band region due to a high defect-free target pulling speed and indicates that the O-band region becomes disappeared according to a decrease in a pulling speed (PS), e.g., a decrease of 0.01 mm/min.

In addition, in the case of the fifth sample S5 positioned at third from the bottom, the entire left-half of the wafer appears white and a single crystal grown on such a target shows that the 0-band has been controlled, and a black portion in which the entire right-half of the wafer appears as a mixture of black and a white indicates the VDP region and a white portion indicates a IDP region, and accordingly, in the case of the fifth sample S5, it can be seen that it is formed like VDP-IDP-VDP which is a defect-free region in the wafer.

Further, in the case of the seventh sample S7 at the bottom, when the entire left and right appear white, it can be seen that a wafer having only the IDP region was fabricated.

In the embodiment, for example, scores in a range of 0 to 300 may be provided to the left side of FIG. 1 and segmentation of the scores may be adjusted.

For example, when a product composed of VDP region and IDP region having the O-band controlled therein as a targeted quality is fabricated, a target score may be determined as 220.

As another example, in FIG. 1, a target score may be determined within 150 to 280. Here, an adjustment rate of the pulling speed for each score may be acquired by acquiring a free margin and dividing it by a score For example, in the case of FIG. 1, the target score is assumed as 0 having no adjustment rate of pulling speed, and uniform quality in an entire prime range may be implemented by adjusting a target pulling speed with an adjustment value corresponding to a score in a corresponding Cu haze scoring map.

Figure 2:
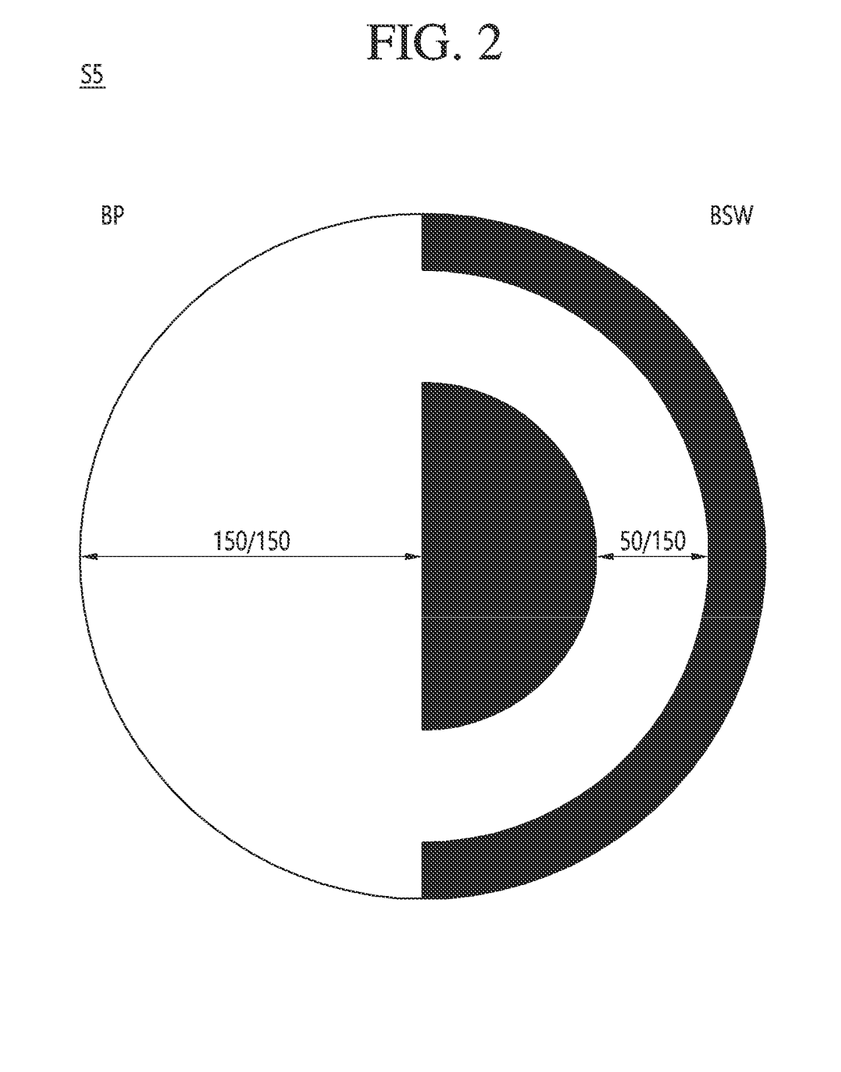
FIG. 2 is an exemplary view of a method of calculating copper-haze score for a fifth sample S5 in a method of evaluating quality of a wafer or a single crystal ingot and a method of controlling quality of the single crystal ingot using the same according to an embodiment of the present disclosure.

FIG. 2 is an exemplary view illustrating a method of calculating a Cu haze score for the fifth sample S5 in a method of evaluating quality of a wafer or single crystal ingot and a method of controlling quality of the single crystal ingot using the same according to an embodiment of the present disclosure.

FIG. 2 is an exemplary view illustrating a method of calculating a Cu haze score for the fifth sample S5 in a method of evaluating quality of a wafer or single crystal ingot and a method of controlling quality of the single crystal ingot using the same according to an embodiment.

FIG. 2 is a cross-sectional view, in which distribution of defects in a vertical direction of a 300 mm single crystal grown according to the embodiment is analyzed by a Cu haze evaluation method, and a method of assigning a score is as below, but the embodiment is not limited thereto.

First, an area of a black portion (left-side of the wafer in FIG. 2) of a first heat treatment (BP) evaluation method according to the Cu haze evaluation method is measured and set as a first heat treatment region. Then, an area of a white region (right-side of the wafer in FIG. 2) of a second heat treatment BSW evaluation method is measured and set as the second heat treatment region. Thereafter, a score value is determined as a value acquired by adding areas of the first heat treatment region and the second heat treatment region.

As another example, in the case of a second S2 sample map in the right-side of FIG. 2, the white portion and the black portion of the map according to the BP evaluation method are mixed, but in this case, it is acquired by adding areas of the black portion and the same manner also applies to a BSW evaluation method.

In the embodiment, a score of 300 corresponds to a cross section of a 300 mm wafer, and a corresponding diameter may be applied as it is according to each diameter and may be used by proportionally adjusting for segmentation.

Contrary to the above embodiment, it may also be possible to use the sum of areas of the black portions of a second sample map as the score of the copper-haze map.

Meanwhile, in the copper-haze evaluation method, an operator directly saw copper-haze map data, divided a mixed region of the white portion and the black portion, and calculated a score according to the summation of the corresponding regions. Accordingly, it was difficult to perform high-quality evaluation in a wafer evaluation process, and the cost and time were considerable because the operator had to manually perform the evaluation.

Hereinafter, a copper-haze evaluation method using an artificial intelligence model according to an embodiment of the present disclosure will be described in FIGS. 3 to 8.

First, it is noticed that the artificial intelligence model of the present disclosure may be composed of various artificial neural network models and may include, for example, a convolutional neural network (CNN), a recurrent neural network (RNN), and the like.

Figure 3:
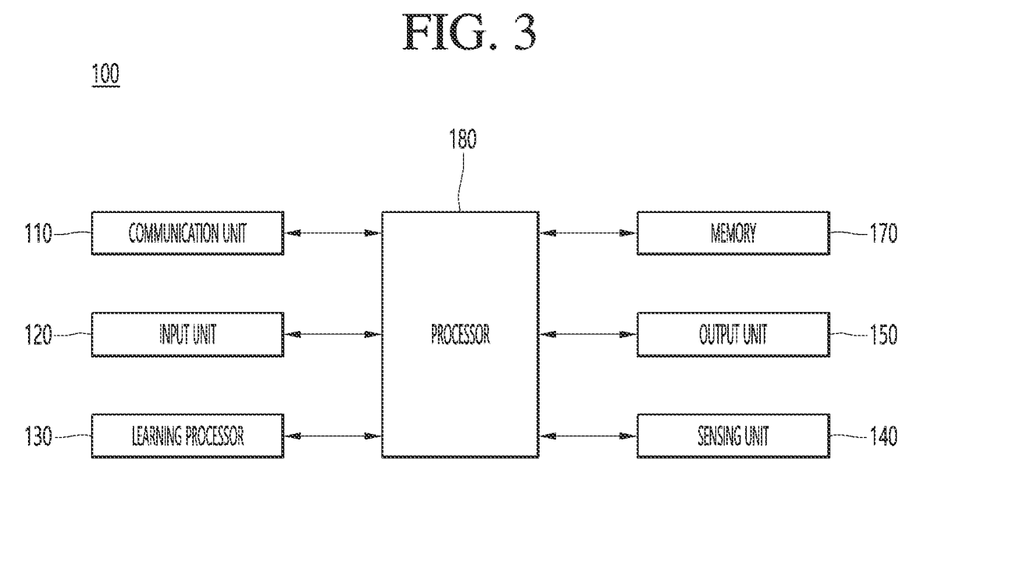
FIG. 3 is a block diagram illustrating configuration of an apparatus of evaluating quality of a wafer of the present disclosure.

FIG. 3 is a block diagram showing the configuration of an apparatus of evaluating quality of a wafer of the present disclosure.

Referring to FIG. 3, a wafer quality evaluation apparatus 100 may be implemented by a fixed device, a movable device, or the like such as a TV, a projector, a mobile phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a desktop computer, a digital signage, a robot, and a vehicle.

Referring to FIG. 3, the wafer quality evaluation apparatus 100 may include a communication unit 110, an input unit 120, a learning processor 130, a sensing unit 140, an output unit 150, a memory 170, a processor 180, and the like.

The communication unit 110 may transmit/receive data to/from external devices such as other devices or a server using wired/wireless communication technology.

The input unit 120 may receive image data. In addition, the input unit 120 may acquire various types of data such as a voice signal reception and a user input unit for acquiring data from a user.

The learning processor 130 may train a model composed of an artificial neural network using learning data. Here, the learned artificial neural network may be referred to as a learning model. The learning model may be used to infer a result value with respect to new input data other than the learning data, and the inferred value may be used as a basis for a decision to perform a certain operation.

Meanwhile, the artificial intelligence model to be mounted on the wafer quality evaluation apparatus 100 may be learned in the learning processor 130, and the artificial intelligence model may also receive transmission from the external device or the server.

The sensing unit 140 may acquire at least one piece of internal information of the AI apparatus 100, surrounding environment information of the AI apparatus 100, and user information using various sensors.

In addition, the sensing unit 140 may include a camera and may receive an image for determining defects of the wafer using the camera.

The output unit 150 may generate an output related to sight, hearing, or touch.

The memory 170 may store data supporting various functions of the AI apparatus 100. For example, the memory 170 may store input data acquired from the input unit 120, learning data, a learning model, a learning history, and the like.

The processor 180 may determine at least one executable operation of the AI apparatus 100 based on information determined or generated using a data analysis algorithm or a machine learning algorithm. In addition, the processor 180 may control components of the AI apparatus 100 to perform the determined operation.

The processor according to the embodiment of the present disclosure may control the overall operation of the wafer quality evaluation apparatus.

Figure 4:
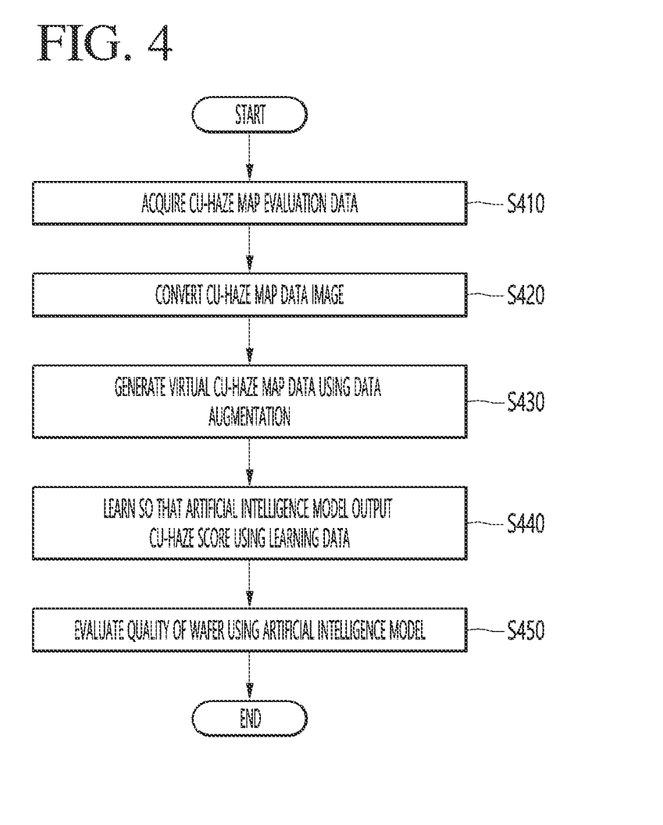
FIG. 4 is a flowchart illustrating a method of evaluating quality of a wafer according to an embodiment of the present disclosure.

FIG. 4 is a flowchart illustrating a method of evaluating quality of a wafer according to an embodiment of the present disclosure.

Referring to FIG. 4, the processor of the wafer quality evaluation apparatus according to the embodiment of the present disclosure may acquire copper-haze map evaluation data (S410). Specifically, the wafer quality evaluation apparatus according to the embodiment of the present disclosure may perform a copper-haze evaluation on a piece of a wafer or a single crystal ingot, and thereafter the copper-haze map data and copper-haze score acquired in the copper-haze evaluation may be acquired as the copper-haze map evaluation data. The acquired copper-haze map evaluation data may be stored in a memory.

At this time, S410 represents a process of collecting results according to a conventional copper-haze evaluation method, and subsequent processes S420 to S450 provide the wafer quality evaluation apparatus through artificial intelligence model learning using the data collected in S410.

After acquiring the copper-haze map evaluation data, the processor of the wafer quality evaluation apparatus according to the embodiment of the present disclosure may transform an image of the copper-haze map data (S420).

At this time, the image transformation of the copper-haze map data may include at least one transformation of rotation, translation, scale, tilt, shearing, reflection, rotation, and clipping of the copper-haze map image. An example of an image transformation method will be described in FIGS. 5 to 7.

The processor according to the embodiment of the present disclosure may generate virtual copper-haze map data using data augmentation after image transformation of the copper-haze map data (S430).

Meanwhile, since image transformation is essential in a data augmentation process, the process S420 may also be included in S430.

The processor according to the embodiment of the present disclosure may generate virtual copper-haze map data using data augmentation (S420 and S430) and may train the artificial intelligence model based on the copper-haze map data and the copper-haze evaluation score (S440).

Specifically, the processor may train the artificial intelligence model using the copper-haze map data and a copper-haze evaluation score corresponding to the virtual copper-haze map data generated according to the augmentation of the learning data.

When the processor according to the embodiment of the present disclosure inputs the copper-haze map data using the learned artificial intelligence model, the copper-haze evaluation score may be acquired (S450).

According to an output value of the artificial intelligence model, the operator will be able to perform crystal defect evaluation on the piece of wafer or the single crystal ingot.

An operational example of a specific artificial intelligence model will be described in FIG. 8.

Meanwhile, it is described that the artificial intelligence model is learned by the processor, but it will also be possible for the wafer quality evaluation device to receive an artificial intelligence model learned from an external device or server.

Hereinafter, the data augmentation process according to S420 and S430 in FIGS. 5 to 7 will be described.

Figure 5:
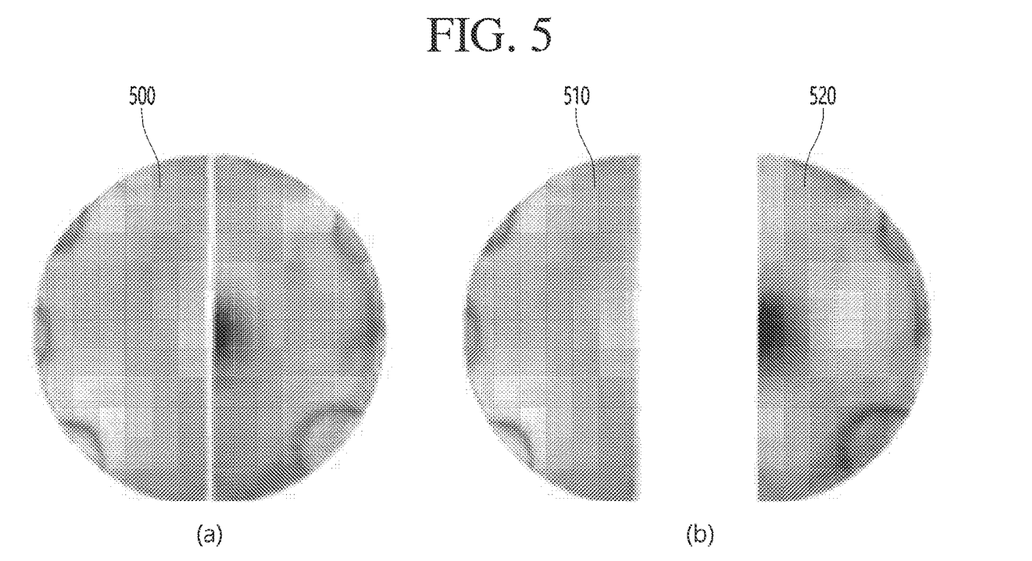
FIG. 5 is a view illustrating a data augmentation process according to an embodiment of the present disclosure.

FIG. 5 is a view illustrating a data augmentation process according to an embodiment of the present disclosure.

Referring to FIG. 5, the performing of the learning data augmentation according to the embodiment of the present disclosure may include dividing the copper-haze map data into a BP region and a BSW region, performing image transformation on each of the divided images, and generating the virtual copper-haze map data based on each of the divided images on which the image transformation has been performed.

The BP region and the BSW region refer to a heat treatment method that is designed so that the O-band region, the VDP region, the IDP region, and the LDP region may be distinguished through the first heat treatment (BP) and the second heat treatment (BSW) by the copper-haze evaluation method, and the first heat treatment and the second heat treatment are different from each other.

In general, when a wafer is divided in half in the copper-haze evaluation method, a left portion of the wafer may refer to the BP region and a right portion of the wafer may refer to the BSW region.

As described above, since a defect rate is not high in a wafer process, a phenomenon occurs in which data for training the artificial intelligence model is insufficient.

Specifically, when the artificial intelligence model is learned with copper-haze map data and a copper-haze score based on actual data, the artificial intelligence model may not learn enough because learning data for detecting low-quality wafers is insufficient, and there is no choice but to create an artificial intelligence model that is over-fitted on high quality wafers.

Therefore, the performance of the artificial intelligence model may be significantly reduced.

The processor 180 according to the embodiment of the present disclosure may perform data augmentation in order to secure learning data of the artificial intelligence model and prevent the over-fitting.

The processor according to the embodiment of the present disclosure may perform the learning data augmentation that generates at least one piece of virtual copper-haze map data based on the copper-haze map data.

Specifically, referring to FIG. 5, the processor may divide the copper-haze map data into the BP region and the BSW region in order to perform the learning data augmentation.

For example, the left side of a copper-haze map 500 of wafer shown in FIG. 5A indicates copper-haze map data subjected to the BP heat treatment and the right side thereof indicates copper-haze map data subjected to the BSW heat treatment.

Referring to FIG. 5B, the processor may divide the copper-haze map data of FIG. 5A into a BP region 510 subjected to the BP heat treatment and a BSW region 520 subjected to the BSW heat treatment.

In other words, in FIG. 5, two divided images may be generated using the copper-haze map data.

The processor according to the embodiment of the present disclosure may generate the virtual copper-haze map data through image transformation of each of the divided BP region 510 and BSW region 520.

Figure 6:
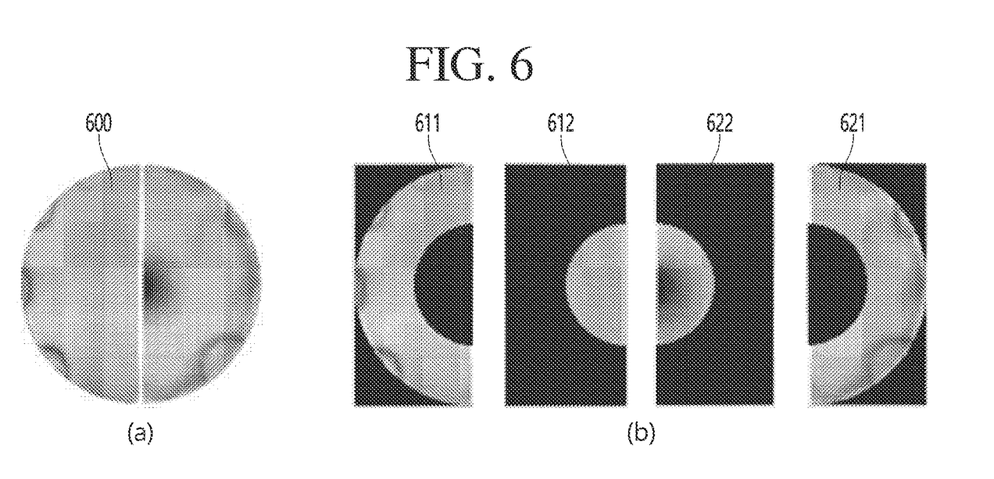
FIG. 6 is a view illustrating a data augmentation process according to an embodiment of the present disclosure.

FIG. 6 is a view illustrating a data augmentation process of a method different from that of FIG. 5.

FIG. 6 illustrates a data augmentation process according to another embodiment of the present disclosure. The duplicated content of FIG. 5 will be briefly described.

The method of evaluating quality of the wafer according to the embodiment of the present disclosure may further include dividing the BP region and the BSW region into an edge region and a center region, respectively in the dividing of the copper-haze map data into the BP region and the BSW region.

Specifically, the processor according to the embodiment of the present disclosure may divide the BP region and the BSW region and divide the BP region and the BSW region into an edge region and a center region, respectively.

In this case, as for the division of the edge region and the center region, a portion within a preset distance from the center point of the wafer may be set as the center region, and a portion other than the preset distance from the center point of the wafer may be set as the edge region.

For example, assuming that the wafer is 300 mm, the center region may be 200 mm including 100 mm to the left and right, respectively from the center of the wafer, and a remaining region from the center of the wafer to 200 mm to 300 mm may be set as the edge region.

Referring to FIG. 6A, copper-haze map data 600 of a wafer including the BP region and the BSW region is shown.

Referring to FIG. 6B, the processor may divide the BP region 610 into an edge region 611 and a center region 612.

In addition, the processor may divide the BSW region 620 into an edge region 621 and a center region 622. In other words, in FIG. 6, four divided images may be generated using one copper-haze map data.

After dividing the copper-haze map data 600 as shown in FIG. 6B, the processor according to the embodiment of the present disclosure may perform image transformation on each of the divided images.

Hereinafter, a process of generating final virtual copper-haze map data by performing image transformation on each of the images divided in FIGS. 5 and 6 will be described in FIG. 7.

Figure 7:
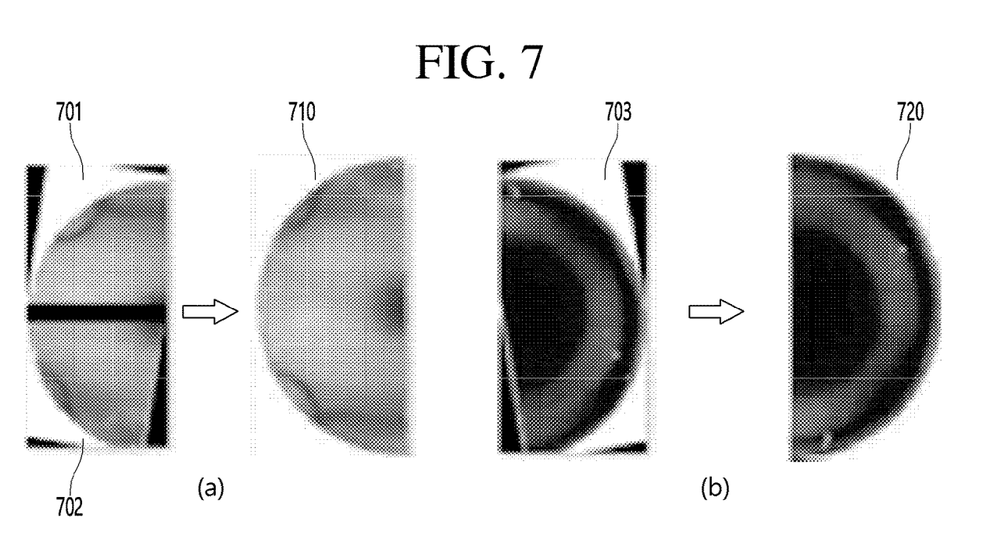
FIG. 7 is a view illustrating a data augmentation process according to an embodiment of the present disclosure.

FIG. 7 is a view illustrating a data augmentation process according to an embodiment of the present disclosure.

FIG. 7 is a view illustrating a process of performing image transformation on the divided images of the BP region and the BSW region generated by one method of FIGS. 5 and 6 and generating virtual copper-haze map data.

Referring to FIG. 7, the processor according to the embodiment of the present disclosure may perform image transformation on each of the divided images of copper-haze map data.

Specifically, the processor may perform image transformation on each of the images of the BP region and the BSW region of the copper-haze map data.

In another embodiment, the processor may perform image transformation on the center region and edge region of the BP region of the copper-haze map data and perform image transformation on the center region and the edge region of the BSW region of the copper-haze map data.

In this case, the image transformation may include transformation of at least one of tilt, shearing, reflection, rotation, and clipping of the image.

For example, referring to FIG. 7A, an example of generating virtual copper-haze map data by image-transforming the divided image of the copper-haze map data and synthesizing the image-transformed image is illustrated.

Specifically, the processor may generate a first divided image 701 by rotating or tilting the divided image of the BP region.

In addition, the processor may generate a second divided image 703 by rotating or tilting the divided image of the BSW region. The above process is merely an example, and various divided images may be generated using at least one of tilt, shearing, reflection, rotation, and clipping included in the image transformation.

The processor may generate virtual copper-haze map data 710 and 720 by synthesizing the generated divided image with the background of the copper-haze map data.

In other words, since most of the copper-haze map data for training the artificial intelligence model is data of normal quality rather than data with defects, the distribution of copper-haze map scoring is only a specific class. Therefore, there is not sufficient learning data for the artificial intelligence model, and thus the number of data is arbitrarily increased.

As shown in FIG. 7, the processor may gradually change the divided image to a preset angle (e.g., 1 degree to 359 degrees) to generate virtual copper-haze map data and increase the number of data, or may generate the virtual copper-haze map data through methods such as turning the screen over and cutting it in quarters.

The processor according to the embodiment of the present disclosure may include the virtual copper-haze map data in the learning data and may train the artificial intelligence model.

Figure 8:
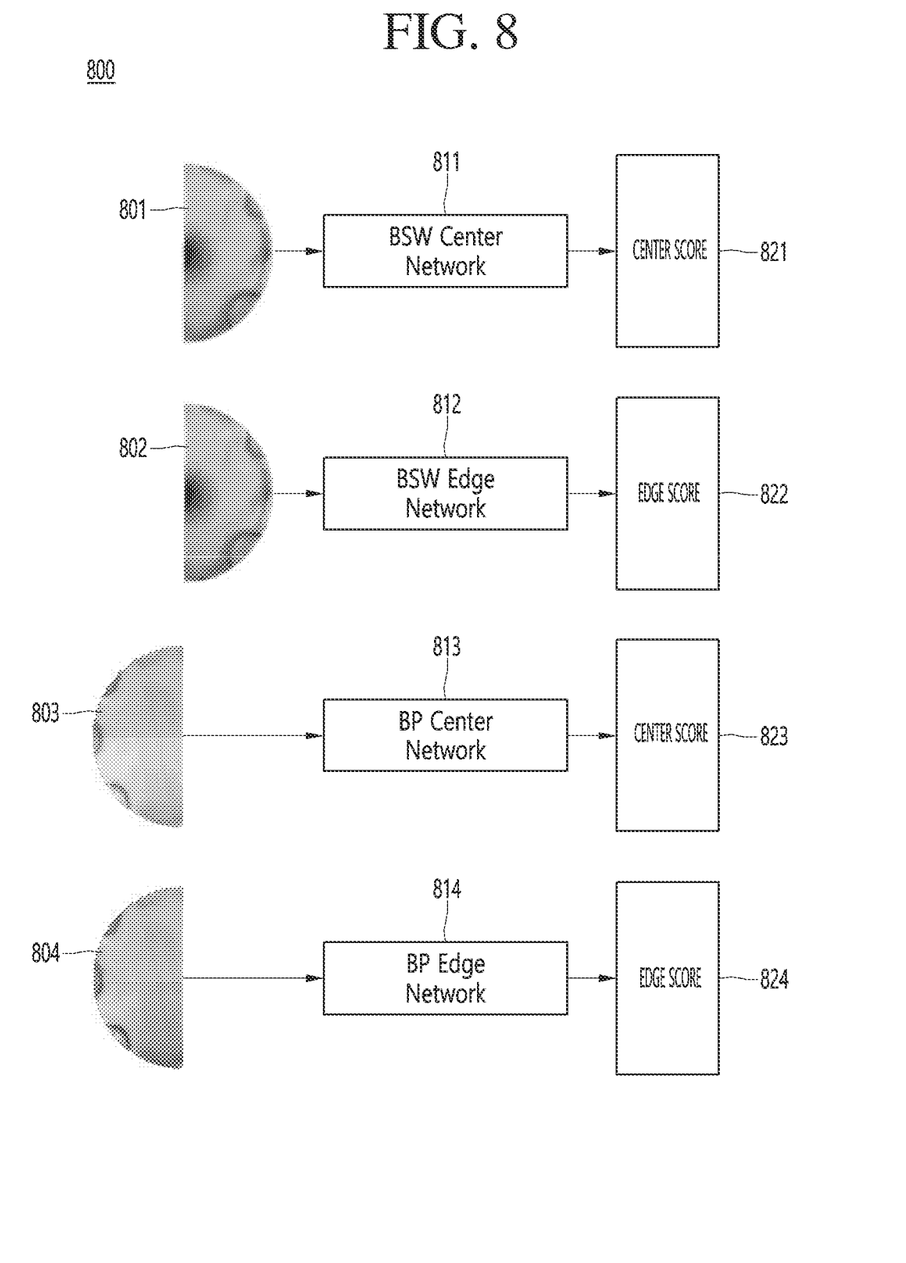
FIG. 8 is a view illustrating an artificial intelligence model according to an embodiment of the present disclosure.

FIG. 8 is a view illustrating an artificial intelligence model according to an embodiment of the present disclosure.

The processor according to the embodiment of the present disclosure may acquire the learning data of the artificial intelligence model by performing learning data augmentation that generates at least one piece of virtual copper-haze map data based on the copper-haze map data.

The processor may match the copper-haze map data and the copper-haze evaluation score corresponding to the virtual copper-haze map data generated according to the learning data augmentation.

Specifically, the copper-haze score calculated from the copper-haze map data may be set equal to the score of the virtual copper-haze map data generated based on the copper-haze map data.

The processor may acquire the learning data by storing the copper-haze map data, the virtual copper-haze map data, and the copper-haze score in the memory.

The processor according to the embodiment of the present disclosure may train the artificial intelligence model using the learning data.

The artificial intelligence model may be formed of the artificial neural network, and the artificial neural network may include an input layer, an output layer, and optionally one or more hidden layers. Each layer may include one or more neurons, and the artificial neural network may include neurons and synapses connecting the neurons. In the artificial neural network, each of the neurons may output a function value of an activation function for input signals, weights, and biases input through the synapses.

Machine learning may be classified into supervised learning, unsupervised learning, and reinforcement learning according to a learning method.

The processor of the present disclosure may train the correlation between the copper-haze map data and the copper-haze score in the artificial intelligence model.

Referring to FIG. 8, the processor may set the virtual copper-haze map data and the copper-haze map data as input values and set the copper-haze score corresponding to the copper-haze map data as a result value to train an artificial intelligence model 800.

Specifically, the artificial intelligence model 800 may include a plurality of artificial intelligence models 811, 812, 813, and 814 therein. A BSW center model 811 among the plurality of artificial intelligence models may be learned so as to output a center score 821 in the BSW region of the copper-haze scores of inputted copper-haze map data when copper-haze map data of the BSW region or virtual copper-haze map data 801 of the BSW region is input.

In addition, a BSW edge model 812 among the plurality of artificial intelligence models may be learned so as to output an edge score 822 in the BSW region of the copper-haze scores of inputted copper-haze map data when copper-haze map data of the BSW region or virtual copper-haze map data 802 of the BSW region is input.

In addition, a BP center model 813 among the plurality of artificial intelligence models may be learned so as to output a center score 823 in the BP region of the copper-haze scores of inputted copper-haze map data when copper-haze map data of the BP region or virtual copper-haze map data 803 of the BP region is input.

In addition, a BP edge model 814 among the plurality of artificial intelligence models may be learned so as to output an edge score 824 in the BP region of the copper-haze scores of inputted copper-haze map data when copper-haze map data 804 of the BP region or virtual copper-haze map data of the BP region is input.

The artificial intelligence model learned according to the above process may include a regression model and may output the copper-haze scores of the edge region and the center region of the BP region and the edge region and the center region of the BSW region.

A process of using the artificial intelligence model learned through the learning process is as follows.

That is, the processor according to the embodiment of the present disclosure may acquire the copper-haze map data of the wafer during copper-haze evaluation.

The processor may input the copper-haze map data into the artificial intelligence model.

When the learned artificial intelligence model receives the copper-haze map data, it may divide each of the copper-haze map and virtual copper-haze map data into the BP region and the BSW region, and the artificial intelligence model may calculate the copper-haze score for each of the edge region and the center region of the BP region and the BSW region.

The processor may output the copper-haze score for each region output by the artificial intelligence model through a display unit.

The operator may evaluate the crystal defects of the BP region and the BSW region based on the output copper-haze score.

In addition, the above description has been focused on the embodiments, but it is merely illustrative and does not limit the present invention. Those skilled in the art to which the embodiments pertain may appreciate that various modifications and applications not illustrated above are possible without departing from the essential features of the embodiment. For example, each component particularly represented in the embodiments may be modified and realized. In addition, it should be construed that differences related to such a modification and an application are included in the scope of the present invention defined in the appended claims.

What is claimed is:

1. A method of evaluating quality of a wafer, the method comprising:
    performing a copper-haze evaluation on a piece of wafer or a single crystal ingot;
    collecting copper-haze map data and a copper-haze evaluation score based on a result of the copper-haze evaluation;
    training an artificial intelligence model based on the copper-haze map data and the copper-haze evaluation score; and
    performing crystal defect evaluation on the piece of the wafer or the single crystal ingot using the learned artificial intelligence model that outputs the copper-haze evaluation score when the copper-haze map data is input,
    wherein the training of the artificial intelligence model based on the copper-haze map data and the copper-haze evaluation score comprises;
    performing learning data augmentation that generates at least one piece of virtual copper-haze map data based on the copper-haze map data; and
    training the artificial intelligence model using the copper-haze evaluation score corresponding to the virtual copper-haze map data generated according to the copper-haze map data and the learning data augmentation, and
    wherein the performing of the learning data augmentation comprises;
    dividing the copper-haze map data into a first region and a second region;
    performing image transformation on each of the divided first and second regions; and
    generating the virtual copper-haze map data based on each of the divided first and second regions on which the image transformation has been performed, wherein the first region and the second region are formed through a first heat treatment method and a second heat treatment method that are different from each other, respectively.

2. The method of claim 1, wherein the dividing of the copper-haze map data into the first region and the second region further comprises dividing each of the first region and the second region into an edge region and a center region.

3. The method of claim 1, wherein the image transformation includes at least one transformation of tilt, shearing, reflection, rotation, and clipping of an image.

4. The method of claim 1, wherein the performing of the crystal defect evaluation on the piece of the wafer or the single crystal ingot using the learned artificial intelligence model comprises:
dividing each of the copper-haze map and virtual copper-haze map data into a first region and a second region using the learned artificial intelligence model; and
calculating copper-haze scores for an edge region and a center region of each of the first region and the second region, respectively using the learned artificial intelligence model.

5. An apparatus of evaluating quality of a wafer, the apparatus comprising:
an input unit that receives copper-haze map data of a wafer;
a processor that evaluates the quality of the wafer using an artificial intelligence model learned so as to output a copper-haze score when the copper-haze map data is input; and
a display unit that outputs a result of the quality of the wafer,
wherein the processor performs learning data augmentation that generates at least one piece of virtual copper-haze map data based on the copper-haze map data and trains the artificial intelligence model using a copper-haze evaluation score corresponding to the virtual copper-haze map data generated according to the copper-haze map data and the learning data augmentation, and
wherein the processor divides the copper-haze map data into a first region and a second region, performs image transformation on each of the divided first and second regions, and generates the virtual copper-haze map data based on each of the divided first and second regions on which the image transformation is performed.

6. The apparatus of claim 5, wherein the processor further divides each of the first region and the second region into an edge region and a center region, performs the image transformation on each of the divided first and second regions and generates the virtual copper-haze map data based on each of the divided first and second regions on which the image transformation is performed.

7. The apparatus of claim 5, wherein the image transformation includes at least one transformation of tilt, shearing, reflection, rotation, and clipping of an image.

* * * * *